United States Patent
Lu et al.

(10) Patent No.: US 12,048,067 B2
(45) Date of Patent: **\*Jul. 23, 2024**

(54) USER EQUIPMENT AND METHOD FOR CONTROLLING TRANSMISSION OF SAME IN A WIRELESS COMMUNICATION SYSTEM

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 105 days.

This patent is subject to a terminal disclaimer.

(21) Appl. No.: 17/586,648

(22) Filed: Jan. 27, 2022

(65) Prior Publication Data
US 2022/0159780 A1    May 19, 2022

Related U.S. Application Data

(63) Continuation of application No. 16/993,037, filed on Aug. 13, 2020, now Pat. No. 11,265,965, which is a
(Continued)

(51) Int. Cl.
*H04W 80/08* (2009.01)
*H04L 1/00* (2006.01)
(Continued)

(52) U.S. Cl.
CPC .......... *H04W 80/08* (2013.01); *H04L 1/0005* (2013.01); *H04L 1/0013* (2013.01);
(Continued)

(58) Field of Classification Search
None
See application file for complete search history.

(56) References Cited

U.S. PATENT DOCUMENTS

| 2016/0269894 A1 | 9/2016 | Sunell et al. |
| 2017/0279858 A1 | 9/2017 | Atarius et al. |
(Continued)

FOREIGN PATENT DOCUMENTS

| CN | 101389119 A | 3/2009 |
| CN | 101765151 A | 6/2010 |
(Continued)

OTHER PUBLICATIONS

Guangdong OPPO Mobile Telecommunications Corp. Ltd., JP2020-545763, Notice of Allowance, Mar. 14, 2023, 6 pgs.
(Continued)

*Primary Examiner* — Yemane Mesfin
*Assistant Examiner* — Jeff Banthrongsack
(74) *Attorney, Agent, or Firm* — Morgan, Lewis & Bockius LLP

(57) ABSTRACT

A user equipment and a method for controlling transmission of same in a wireless communication system are provided. The user equipment is configured to implement an access stratum (AS) layer. The method includes receiving, from an upper layer to the AS layer, a first indication and a second indication for a packet, wherein the first indication is configured to indicate whether to perform a packet data control protocol (PDCP) duplication, and the second indication is configured to indicate whether to use a release 15 feature and controlling the AS layer not to perform the PDCP duplication and controlling the AS layer not to use the release 15 feature when the first indication indicates to perform the PDCP duplication and the second indication indicates not to use the release 15 feature.

18 Claims, 3 Drawing Sheets

Related U.S. Application Data continuation of application No. PCT/CN2019/076465, filed on Feb. 28, 2019.

(60) Provisional application No. 62/638,088, filed on Mar. 3, 2018.

(51) Int. Cl.
*H04L 5/00* (2006.01)
*H04W 4/40* (2018.01)
*H04W 28/06* (2009.01)

(52) U.S. Cl.
CPC ............. *H04L 5/0044* (2013.01); *H04W 4/40* (2018.02); *H04W 28/06* (2013.01)

(56) References Cited

U.S. PATENT DOCUMENTS

| | | | |
|---|---|---|---|
| 2019/0182859 A1 | 6/2019 | Khoryaev et al. | |
| 2019/0230645 A1* | 7/2019 | Cheng | H04W 4/70 |

FOREIGN PATENT DOCUMENTS

| | | | | |
|---|---|---|---|---|
| CN | 105934896 A | 9/2016 | | |
| CN | 107147479 A | 9/2017 | | |
| CN | 107241164 A | 10/2017 | | |
| CN | 108401484 A * | 8/2018 | ........... | H04L 1/0006 |
| WO | WO 2017135052 A1 | 8/2017 | | |
| WO | WO-2019108123 A1 * | 6/2019 | ........ | H04W 28/0268 |

OTHER PUBLICATIONS

Guangdong OPPO Mobile Telecommunications Corp. Ltd., KR10-2020-7025558, First Office Action, Mar. 29, 2023, 8 pgs.
Qualcomm Incorporated, "Coexistence between Rel-14 and Rel-15 V2X UEs", R2-1713407, 3GPP TSG RAN WG2 Meeting #100, Reno, USA, Nov. 27-Dec. 1, 2017, 3 pgs.
Guangdong OPPO Mobile Telecommunications Corp. Ltd., International Search Report and Written Opinion, PCT/CN2019/076465, May 31, 2019, 6 pgs.
Guangdong OPPO Mobile Telecommunications Corp. Ltd., First Examination Report, AU2019230823, Aug. 4, 2022, 3 pgs.
Guangdong OPPO Mobile Telecommunications Corp. Ltd., Notice of Priority Review of Patent Application, CN202010463081.4, Aug. 19, 2021, 6 pgs.
Guangdong OPPO Mobile Telecommunications Corp. Ltd., First Office Action, CN202010463081.4, Aug. 25, 2021, 22 pgs.
Guangdong OPPO Mobile Telecommunications Corp. Ltd., Notification to Grant Patent Right for Invention, CN202010463081.4, Oct. 29, 2021, 6 pgs.
Guangdong OPPO Mobile Telecommunications Corp. Ltd., Extended European Search Report, EP19763869.5, Feb. 12, 2021, 11 pgs.
Guangdong OPPO Mobile Telecommunications Corp. Ltd., Examination Report, IN202017036116, Nov. 22, 2021, 6pgs.
Huawei, HiSilicon, "Overview of LTE URLLC," 3GPP TSG RAN WG1 Meeting #90bis, R1-1717110, Prague, Czech Republic, Oct. 9-13, 2017, 6 pgs.
Kazuaki Takeda, "Status Report to TSG, Study on New Radio Access Technology," 3GPP TSG RAN meeting #75, RP-170376, Dubrovnik, Croatia, Mar. 6-9, 2017, 157 pgs.
Huawei, CATT, LG Electronics, HiSilicon, China Unicorn, New WID on 3GPP V2X Phase 2, 3GPP TSG RAN Meeting #75, RP-170798, Dubrovnik, Croatia, Mar. 6-9, 2017, 5 pgs.
Potevio, "Packet Duplicaton for eV2X Sidelnc CA." 3GPP TSG-RAN WG2 #100, R2-1712970, Reno, USA, Nov. 27-Dec. 1, 3 pgs.
CATT, "PDCP dupplicaton for eV2X," 3GPP TSG-RAN WG2 #101, R2-1802116, Athens, Greece, Feb. 26-Mar. 2, 4 pgs.
Huawei, HiSilicon, "Discussion on the questions in SA2 Ls on reliability for eV2X," 3GPP TSG-RAN2 Meeting 101, R2-1801907, Athens, Greece, Feb. 26-Mar. 2, 2018, 3 pgs.
Oppo, "Discussion on SA2 questions on PPPR," 3GPP TSG-RAN2 Meeting #101, R2-1801854, Athens, Greece, Feb. 26-Mar. 2, 2018, 2 pgs.
Oppo, "Packet duplication in CA-based eV2x," 3GPP TSG-RAN2 Meeting #101, R2-1801856, Athens, Greece, Feb. 26-Mar. 2, 2018, 3 pgs.
Oppo, "Left issues on TX profile indicator," 3GPP TSG-RAN2 Meeting #102, R2-1806686, Busan, Korea, May 21-25, 2018, 4 pgs.

* cited by examiner

USER EQUIPMENT AND METHOD FOR CONTROLLING TRANSMISSION OF SAME IN A WIRELESS COMMUNICATION SYSTEM

CROSS-REFERENCE TO RELATED APPLICATIONS

The present application is a continuation application of U.S. application Ser. No. 16/993,037, entitled "USER EQUIPMENT AND METHOD FOR CONTROLLING TRANSMISSION OF SAME IN A WIRELESS COMMUNICATION SYSTEM" filed on Aug. 13, 2020, which is based upon International Application No. PCT/CN2019/076465, entitled "USER EQUIPMENT AND METHOD FOR CONTROLLING TRANSMISSION OF SAME IN A WIRELESS COMMUNICATION SYSTEM" filed on Feb. 28, 2019, which claims priority to U.S. Application No. 62/638,088, filed Mar. 3, 2018, the contents of which are hereby incorporated by reference in its entirety.

BACKGROUND OF DISCLOSURE

1. Field of Disclosure

The present disclosure relates to a field of communication systems, and more particularly, to a user equipment and a method for controlling transmission of same in a wireless communication system.

2. Description of Related Art

Latency and reliability play important roles when setting requirements in wireless communication systems. A packet data control protocol (PDCP) duplication is configured to increase reliability as well as potentially decrease latency.

SUMMARY

An object of the present disclosure is to propose a user equipment and a method for controlling transmission of same in a wireless communication system.

In a first aspect of the present disclosure, a user equipment for controlling transmission in a wireless communication system includes a memory, a transceiver, and a processor coupled to the memory and the transceiver. The processor is configured to implement an access stratum (AS) layer to: receive, from an upper layer to the AS layer, a first indication and a second indication for a packet, wherein the first indication is configured to indicate whether to perform a packet data control protocol (PDCP) duplication, and the second indication is configured to indicate whether to use a release 15 feature and control the AS layer not to perform the PDCP duplication and control the AS layer not to use the release 15 feature when the first indication indicates to perform the PDCP duplication and the second indication indicates not to use the release 15 feature.

In a second aspect of the present disclosure, a method for controlling transmission of a user equipment in a wireless communication system is provided. The user equipment is configured to implement an access stratum (AS) layer. The method includes receiving, from an upper layer to the AS layer, a first indication and a second indication for a packet, wherein the first indication is configured to indicate whether to perform a packet data control protocol (PDCP) duplication, and the second indication is configured to indicate whether to use a release 15 feature and controlling the AS layer not to perform the PDCP duplication and controlling the AS layer not to use the release 15 feature when the first indication indicates to perform the PDCP duplication and the second indication indicates not to use the release 15 feature.

In a third aspect of the present disclosure, a non-transitory machine-readable storage medium has stored thereon instructions that, when executed by a computer, cause the computer to perform the above method.

In a fourth aspect of the present disclosure, a terminal device includes a processor and a memory configured to store a computer program. The processor is configured to execute the computer program stored in the memory to perform the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
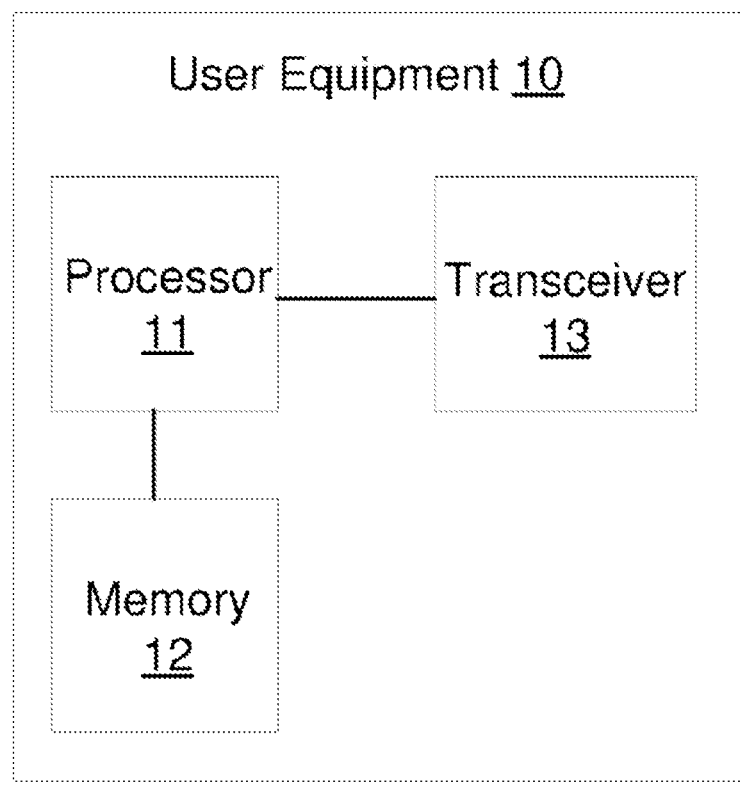
FIG. 1 is a block diagram of a user equipment for controlling transmission in a wireless communication system according to an embodiment of the present disclosure.

FIG. 1 illustrates that, in some embodiments, a user equipment (UE) 10 for controlling transmission in a wireless communication system according to an embodiment of the present disclosure are provided. The UE 10 may include a processor 11, a memory 12, and a transceiver 13. The processor 11 may be configured to implement proposed functions, procedures and/or methods described in this description. Layers of radio interface protocol may be implemented in the processor 11. The memory 12 is operatively coupled with the processor 11 and stores a variety of information to operate the processor 11. The transceiver 13 is operatively coupled with the processor 11, and the transceiver 13 transmits and/or receives a radio signal.

The processor 11 may include an application-specific integrated circuit (ASIC), other chipsets, logic circuit and/or data processing devices. The memory 12 may include a read-only memory (ROM), a random access memory (RAM), a flash memory, a memory card, a storage medium and/or other storage devices. The transceiver 13 may include baseband circuitry to process radio frequency signals. When the embodiments are implemented in software, the techniques described herein can be implemented with modules (e.g., procedures, functions, and so on) that perform the functions described herein. The modules can be stored in the memory 12 and executed by the processor 11. The memory 12 can be implemented within the processor 11 or external to the processor 11, in which those can be communicatively coupled to the processor 11 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, and beyond. UEs communicate with each other directly via a sidelink interface such as a PC5 interface.

In some embodiments, the processor 11 is configured to implement an access stratum (AS) layer to: receive, from an upper layer to the AS layer, a first indication and a second indication for a packet, wherein the first indication is configured to indicate whether to perform a packet data control protocol (PDCP) duplication, and the second indication is configured to indicate whether to use a release 15 feature and control the AS layer not to perform the PDCP duplication and control the AS layer not to use the release 15 feature when the first indication indicates to perform the PDCP duplication and the second indication indicates not to use the release 15 feature.

In some embodiments, the first indication is a proximity-based services (ProSe) per packet reliability (PPPR) indication. In details, the PPPR indication includes a PPPR having eight values ranging from one to eight. When a value of the PPPR is less than a threshold value, the first indication indicates to perform the PDCP duplication.

In some embodiments, the second indication indicating whether to use the release 15 feature further includes the second indication indicating whether to use release 14 non-compatible features. In details, the release 14 non-compatible features can be used corresponding to using the release 15 feature. The release 14 non-compatible features cannot be used corresponding to not to use the release 15 feature.

In some embodiments, the release 14 non-compatible features and the release 15 feature are associated. In details, the release 14 non-compatible features and the release 15 feature both include a release 15 format including rate matching, transport block size (TBS) scaling, and/or a modulation and coding scheme (MCS) table supporting a 64 quadrature amplitude modulation (64QAM).

In some embodiments, when the second indication indicates to use the release 15 feature, the second indication indicates to use a release 15 format including using rate matching, transport block size (TBS) scaling, and/or a modulation and coding scheme (MCS) table supporting a 64 quadrature amplitude modulation (64QAM) to transmit a corresponding V2X packet.

In some embodiments, the processor 11 is configured to implement an access stratum (AS) layer to: receive, from an upper layer to the AS layer, a first indication and a second indication for a packet and/or service, determine a plurality of combinations of the first indication and the second indication, and control the AS layer to treat one combination of the first indication and the second indication as another combination of the first indication and the second indication.

Figure 2:
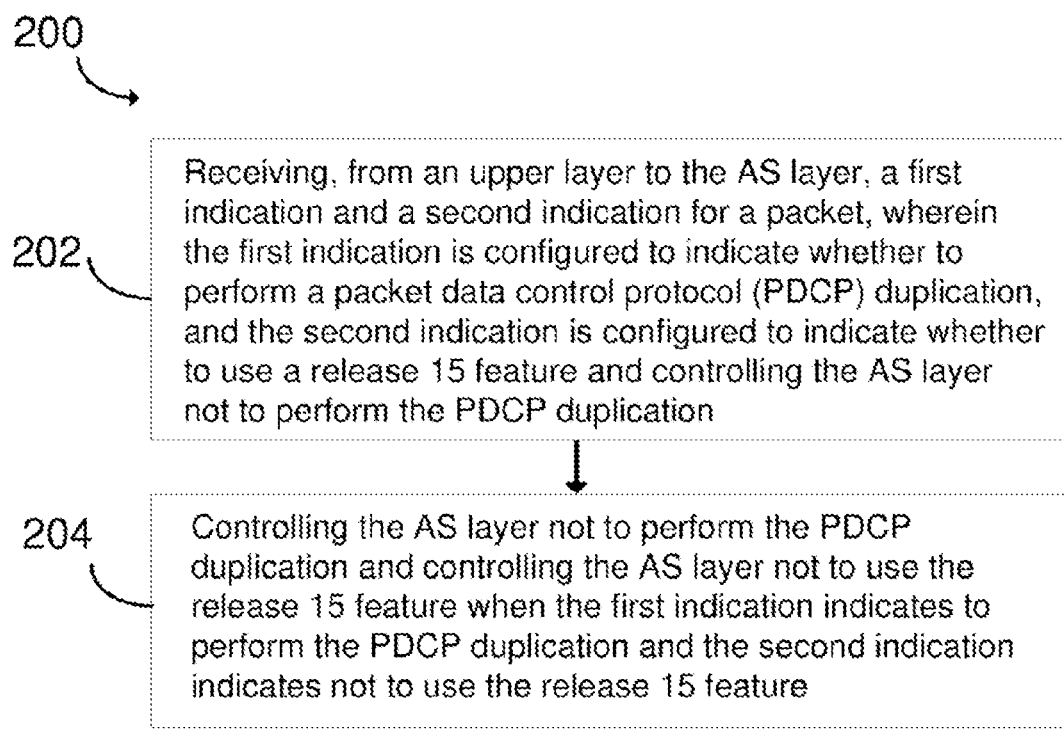
FIG. 2 is a flowchart illustrating a method for controlling transmission of a user equipment in a wireless communication system according to an embodiment of the present disclosure.

FIG. 2 illustrates a method 200 for controlling transmission of the UE 10 in a wireless communication system according to an embodiment of the present disclosure.

In some embodiments, the user equipment 10 is configured to implement an access stratum (AS) layer. The method 200 includes: at block 202, receiving, from an upper layer to the AS layer, a first indication and a second indication for a packet, wherein the first indication is configured to indicate whether to perform a packet data control protocol (PDCP) duplication, and the second indication is configured to indicate whether to use a release 15 feature and controlling the AS layer not to perform the PDCP duplication, and at block 204, controlling the AS layer not to perform the PDCP duplication and controlling the AS layer not to use the release 15 feature when the first indication indicates to perform the PDCP duplication and the second indication indicates not to use the release 15 feature.

In some embodiments, the first indication is a proximity-based services (ProSe) per packet reliability (PPPR) indication. In details, the PPPR indication includes a PPPR having eight values ranging from one to eight. When a value of the PPPR is less than a threshold value, the first indication indicates to perform the PDCP duplication.

In some embodiments, the second indication indicating whether to use the release 15 feature further includes the second indication indicating whether to use release 14 non-compatible features. In details, the release 14 non-compatible features can be used corresponding to using the release 15 feature. The release 14 non-compatible features cannot be used corresponding to not to use the release 15 feature.

In some embodiments, the release 14 non-compatible features and the release 15 feature are associated. In details, the release 14 non-compatible features and the release 15 feature both include a release 15 format including rate matching, transport block size (TBS) scaling, and/or a modulation and coding scheme (MCS) table supporting a 64 quadrature amplitude modulation (64QAM).

In some embodiments, the user equipment 10 is configured to implement an access stratum (AS) layer. The method includes: receiving, from an upper layer to an access stratum (AS) layer, a first indication and a second indication for a packet and/or service, determining a plurality of combinations of the first indication and the second indication, and controlling the AS layer to treat one combination of the first indication and the second indication as another combination of the first indication and the second indication.

In some embodiments, controlling the AS layer to treat the one combination of the first indication and the second indication as the another combination of the first indication and the second indication further includes controlling the AS layer to override the one combination of the first indication and the second indication with the another combination of the first indication and the second indication.

In some embodiments, the first indication is a proximity-based services (ProSe) per packet reliability (PPPR) indication. The second indication is a release version indication configured to indicate the AS layer a usage of a release 14 feature or a release 15 feature. In details, the usage of the release 15 feature includes using a release 15 format including using rate matching, transport block size (TBS) scaling, and/or a modulation and coding scheme (MCS) table supporting a 64 quadrature amplitude modulation (64QAM) to transmit a corresponding V2X packet.

Further, in some embodiments, the one combination of the first indication and the second indication includes that a specific value(s) of PPPR is/are used and the release 14 feature is used. The another combination of the first indication and the second indication includes the specific value(s) of PPPR is/are not used and the release 14 feature is used.

In release 15 eV2x, 3GPP introduces following factors for the AS layer to decide on transmission mechanism. PPPR is provided by the upper layer and is used to indicate the AS layer on a required reliability (e.g., 90%, 99.9%, 99.99%, and etc.) for a specific packet and/or service. According to the PPPR, the AS layer knows whether to use a specific transmission mechanism (e.g., PDCP duplication) to improve reliability. A release version indication (the name of it is under discussion) is provided by the upper layer and is used to indicate the AS layer on the usage of the release 15 feature for a specific packet and/or service. Based on it, the AS layer knows whether to use the release 15 feature.

Therefore, there would be rigorously four combinations for the two factors (such as PPPR and the release version indication).

Combination 1. PPPR indicates that PDCP duplication is needed, and the release version indication indicates that the release 15 feature (such as release 14 non-compatible features) cannot be used.

Combination 2. PPPR indicates that PDCP duplication is needed, and the release version indication indicates that the release 15 feature (such as release 14 non-compatible features) can be used.

Combination 3. PPPR indicates that PDCP duplication is not needed, and the release version indication indicates that the release 15 feature (such as release 14 non-compatible features) cannot be used.

Combination 4. PPPR indicates that PDCP duplication is not needed, and the release version indication indicates that the release 15 feature (such as release 14 non-compatible features) can be used.

Where the combination 1 is problematic one, because, on one hand, the release 15 feature (such as release 14 non-compatible features) cannot be used, which means that the release 14 transmission mechanism is used to ensure a reception of legacy release 14 V2X UEs. On another hand, PPPR indicates that PDCP duplication is used, and 3GPP agrees to make use of a reserved MAC link control identifier (LCID) values in the release 14 to support PDCP duplication, which means that PDCP duplication is not fully release 14 compatibles. Therefore, the problem is how to solve the conflict between the two aspects.

In more details, the release 14 LCID usable is defined as follows (in TS 36.321).

TABLE 1

Values of LCID for a sidelink shared channel (SL-SCH).

| Index | LCID values |
|---|---|
| 00000 | Reserved |
| 00001-01010 | Identity of the logical channel |
| 01011-10100 | Identity of the logical channel which is used for duplication |
| 10101-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

For a reserved LCID, a release 14 UE would not recognize the reserved LCID, and thus if a MAC PDU contains a MAC sub-header, which contains a reserved and/or invalid LCID, a whole MAC PDU would be discarded, i.e., according to TS 36.321. When a MAC entity receives a MAC PDU for the MAC entity's C-RNTI or semi-persistent scheduling C-RNTI, or by a configured downlink assignment, or on the SL-SCH, containing reserved or invalid values, the MAC entity discards the received PDU.

In addition, PDCP duplication defined in the release 15 is to make use of the reserved LCID values defined in the release 14, as long as a duplicated MAC SDU is contained in a specific MAC PDU, the whole MAC PDU would be discarded, even if the other MAC SDUs contains valid LCID, and is received by release 14 UEs. In one word, this would cause packet loss.

In one embodiment, when the upper layer provides the two factors (PPPR and release version indication), only three combination would be possible.

Combination 2. PPPR indicates that PDCP duplication is needed, and the release version indication indicates that the release 15 feature (such as release 14 non-compatible features) can be used.

Combination 3. PPPR indicates that PDCP duplication is not needed, and the release version indication indicates that the release 15 feature (such as release 14 non-compatible features) cannot be used.

Combination 4. PPPR indicates that PDCP duplication is not needed, and the release version indication indicates that the release 15 feature (such as release 14 non-compatible features) can be used.

The combination 1 would be excluded by the upper layer already.

When the lower layer gets different packets and/or services from the upper layer, the different packets and/or services may be associated with the following factor combinations. Packet and/or service 1 is associated with the combination 2. Packet and/or service 2 is associated with the combination 3. Packet and/or service 3 is associated with the combination 4.

Further, the AS layer would generate separate MAC PDUs, this is just to illustrate that the MAC PDUs for the packets and/or services 1 and 3 and the packet and/or service 2 are separated, but it is still allowed to use multiple MAC PDUs to serve the packets and/or services 1 and 3, and it is also allowed to use multiple MAC PDUs to serve the packet and/or service 2. For example, MAC PDU A is configured to serve the packet and/or service 1 and 3. MAC PDU B is configured to serve the packet and/or service 2. Where the MAC PDU A is to be received by a release 15 UE only since it is not release 14 compatibles, but MAC PDU B can be received by both release 14 UE and release 15 UE since it is release 14 compatibles.

In another embodiment, when the upper layer provides the two factors (PPPR and release version indication), still four combination would be possible.

Combination 1. PPPR indicates that PDCP duplication is needed, and the release version indication indicates that the release 15 feature (such as release 14 non-compatible features) cannot be used.

Combination 2. PPPR indicates that PDCP duplication is needed, and the release version indication indicates that the release 15 feature (such as release 14 non-compatible features) can be used.

Combination 3. PPPR indicates that PDCP duplication is not needed, and the release version indication indicates that the release 15 feature (such as release 14 non-compatible features) cannot be used.

Combination 4. PPPR indicates that PDCP duplication is not needed, and the release version indication indicates that the release 15 feature (such as release 14 non-compatible features) can be used.

When the lower layer gets different packets and/or services from the upper layer, the different packets and/or services may be associated with the following factor combinations.

Packet and/or service 1 is associated with the combination 1. Packet and/or service 2 is associated with the combination 2. Packet and/or service 3 is associated with the combination 3. Packet and/or service 4 is associated with the combination 4.

The AS layer would first override the factor combination of packet and/or service 1, either to factor combination of 2 or 3. In the following, it is assumed that the AS layer overrides the combination 1 with the combination 2, but the similar procedure can be applicable to combination 3 as well. That is, the AS layer overrides the combination 1 with the combination 3.

In some embodiments, the AS layer overrides the combination 1 with the combination 2. Therefore, packet and/or service 1 is associated with the combination 2. Packet and/or service 2 is associated with the combination 2. Packet and/or service 3 is associated with the combination 3. Packet and/or service 4 is associated with the combination 4.

In some embodiments, the AS layer overrides the combination 1 with the combination 3. Therefore, packet and/or service 1 is associated with the combination 3. Packet and/or service 2 is associated with the combination 2. Packet and/or service 3 is associated with the combination 3. Packet and/or service 4 is associated with the combination 4.

The AS layer would generate separate MAC PDUs, this is just to illustrate that the MAC PDUs for packets and/or services 1/2/4 and 3 are separated, but it is still allowed to use multiple MAC PDUs to serve packet and/or service 1/2/4, and it is also allowed to use multiple MAC PDUs to serve packet and/or service 3.

For example, MAC PDU A is configured to serve the packet and/or service 1, 2, and 4. MAC PDU B is configured to serve the packet and/or service 3. Where the MAC PDU A is to be received by a release 15 UE only since it is not release 14 compatibles, but MAC PDU B can be received by both release 14 UE and release 15 UE since it is release 14 compatibles.

In some embodiments, when the upper layer provides the two factors (PPPR and release version indication), still four combination would be possible.

Combination 1. PPPR indicates that PDCP duplication is needed, and the release version indication indicates that the release 15 feature (such as release 14 non-compatible features) cannot be used.

Combination 2. PPPR indicates that PDCP duplication is needed, and the release version indication indicates that the release 15 feature (such as release 14 non-compatible features) can be used.

Combination 3. PPPR indicates that PDCP duplication is not needed, and the release version indication indicates that the release 15 feature (such as release 14 non-compatible features) cannot be used.

Combination 4. PPPR indicates that PDCP duplication is not needed, and the release version indication indicates that the release 15 feature (such as release 14 non-compatible features) can be used.

When the lower layer gets different packets and/or services from the upper layer, the different packets and/or services may be associated with the following factor combinations:

Packet and/or service 1 is associated with the combination 1. Packet and/or service 2 is associated with the combination 2. Packet and/or service 3 is associated with the combination 3. Packet and/or service 4 is associated with the combination 4.

For packet and/or service 1, the AS layer still follows the upper layer indication, i.e., keep the factor combination 1 as it is. When generating MAC PDUs, in the packet and/or service 1, PDCP duplication is to be used, e.g., it would generate two duplicated PDCP PDU, i.e., PDCP PDUs I and II. For MAC SDUs generated from the PDCP PDU I, it uses the LCID compatible with release 14, i.e., reserved LCID is not used. For MAC SDUs generated from PDCP PDU II, it uses the LCID is non-compatible with release 14 (such as the release 15 feature), i.e., reserved LCID is used.

The embodiments are not limited to the case the packet and/or service 1 is only for a single PDCP PDU, but just use that to illustrate the procedure. In other words, there can be multiple PDCP PDUs included in the packet and/or service 1.

The AS layer would generate separate MAC PDUs, this is just to illustrate that the MAC PDUs for the packets and/or services 2 and 4, MAC SDUs generated from the PDCP PDU II of the packets and/or services 1 and 3, and MAC SDUs generated from the PDCP PDU I of the packet and/or service 1 are separated, but it is still allowed to use multiple MAC PDUs to serve the packets and/or services 2 and 4, and the MAC SDUs generated from the PDCP PDU II of the packet and/or service 1, and it is also allowed to use multiple MAC PDUs to serve the packet and/or service 3 and MAC SDUs generated from the PDCP PDU I of the packet and/or service.

For example, MAC PDU A is configured to serve the packets and/or services 2 and 4 and MAC SDUs generated from the PDCP PDU II of the packet and/or service 1. MAC PDU B for the packet and/or service 3, and MAC SDUs generated from the PDCP PDU I of the packet and/or service 1. Where the MAC PDU A is to be received by a release 15 UE only since it is not release 14 compatibles, but MAC PDU B can be received by both release 14 UE and release 15 UE since it is release 14 compatibles.

In some embodiments, the problem is how to enable release 14 compatible transmission mechanism and PDCP duplication at the same time. The solution can be divided into two types.

Type 1: when the upper layer provides input factors of PPPR and release version indication to the AS layer, the following combination is excluded.

1. On one hand, PPPR is applied and/or present (or a specific value of PPPR is applied and/or present), i.e., reliable transmission is required for the packet and/or service.

2. On another hand, release 14 compatible transmission mechanism is required, i.e., release 15 rate matching scheme, release 15 MCS/TBS table, 64QAM, or transmit diversity is not used.

Type 2: although the upper provides the input factors of PPPR and release version indication to the AS layer in a way that the problematic combination (as described above), but the AS layer solve that by
 1. Either override that one combination with another combinations, i.e., it is essentially the AS layer to remove the problematic combination.
 2. Or still follow the upper layer indicated factor combination, but separate the two duplicated PDCP PDUs.

For PDCP PDU 1, the embodiment uses legacy release 14 LCID values, and uses release 14 compatible transmission mechanism. For PDCP PDU 2, the embodiment uses release 14 reserved LCID values, and uses release 14 non-compatible (such as release 15 feature) transmission mechanism.

Figure 3:
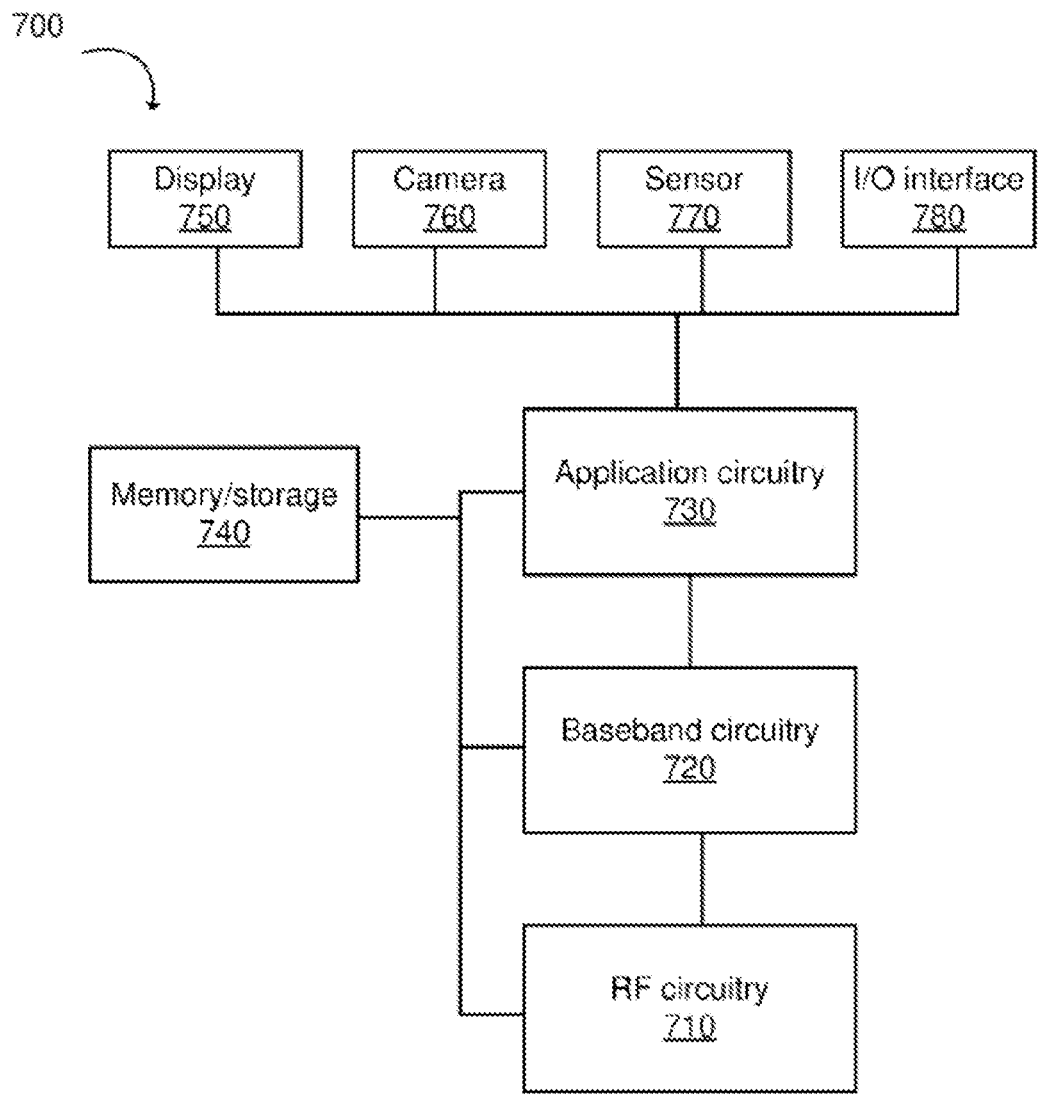
FIG. 3 is a block diagram of a system for wireless communication according to an embodiment of the present disclosure.

FIG. 3 is a block diagram of an example system 700 for wireless communication according to an embodiment of the present disclosure. Embodiments described herein may be implemented into the system using any suitably configured hardware and/or software. FIG. 3 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, a user equipment and a method for controlling transmission of same in a wireless communication system to reach low latency and high reliability are provided. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment for controlling transmission in a wireless communication system, comprising:
 a memory;
 a transceiver; and
 a processor coupled to the memory and the transceiver, wherein the processor is configured to control an access stratum (AS) layer to:
 receive, from an upper layer to the AS layer, a first indication and a second indication for a data unit; and
 control the AS layer not to perform a packet data control protocol (PDCP) duplication when the first indication indicates to perform the PDCP duplication and the second indication indicates to use features compatible with a second release version,
 wherein when the second indication indicates to use features of a first release version, the second indication indicates to use a format of the first release version comprising using rate matching, transport block size (TBS) scaling, and/or a modulation and coding scheme (MCS) table supporting a 64 quadrature amplitude modulation (64QAM) to transmit a corresponding V2X packet.

2. The user equipment of claim 1, wherein the first indication is configured to indicate whether to perform the PDCP duplication, and the second indication is configured to indicate whether to use features of a first release version.

3. The user equipment of claim 1, wherein the first indication comprises a proximity-based services (ProSe) per packet reliability (PPPR).

4. The user equipment of claim 3, wherein the PPPR has eight values ranging from one to eight, when a value of the PPPR is less than a threshold value, the first indication indicates to perform the PDCP duplication.

5. The user equipment of claim 2, wherein the second indication is a release version indication configured to indicate the AS layer a usage of features compatible with the second release version or the features of the first release version.

6. The user equipment of claim 2, wherein the second indication indicating whether to use the features of the first release version further comprises the second indication indicating whether to use features that are not compatible with the second release version.

7. The user equipment of claim 6, wherein the features that are not compatible with the second release version and the features of the first release version are associated.

8. A method for controlling transmission of a user equipment in a wireless communication system, wherein the user equipment is configured to control an access stratum (AS) layer, the method comprising:
 receiving, from an upper layer to the AS layer, a first indication and a second indication for a data unit; and
 controlling the AS layer not to perform a packet data control protocol (PDCP) duplication when the first indication indicates to perform the PDCP duplication and the second indication indicates to use features compatible with a second release version,
 when the second indication indicates to use the features of a first release version, the second indication indicates to use a format of the first release version comprising using rate matching, transport block size (TBS) scaling, and/or a modulation and coding scheme (MCS) table supporting a 64 quadrature amplitude modulation (64QAM) to transmit a corresponding V2X packet.

9. The method of claim 8, wherein the first indication is configured to indicate whether to perform the PDCP duplication, and the second indication is configured to indicate whether to use features of a first release version.

10. The method of claim 8, wherein the first indication comprises a proximity-based services (ProSe) per packet reliability (PPPR).

11. The method of claim 10, wherein the PPPR has eight values ranging from one to eight, when a value of the PPPR is less than a threshold value, the first indication indicates to perform the PDCP duplication.

12. The method of claim 9, wherein the second indication is a release version indication configured to indicate the AS layer a usage of features compatible with the second release version or the features of the first release version.

13. The method of claim 9, wherein the second indication indicating whether to use the features of the first release version further comprises the second indication indicating whether to use features that are not compatible with the second release version.

14. The method of claim 13, wherein the features that are not compatible with the second release version and the features of the first release version are associated.

15. A non-transitory machine-readable storage medium having stored thereon instructions that, when executed by a computer, cause the computer to perform a method for controlling transmission of a user equipment in a wireless communication system, wherein the user equipment is configured to control an access stratum (AS) layer, the method comprising:
receiving, from an upper layer to the AS layer, a first indication and a second indication for a data unit; and
controlling the AS layer not to perform a packet data control protocol (PDCP) duplication when the first indication indicates to perform the PDCP duplication and the second indication indicates to use features compatible with a second release version,
wherein when the second indication indicates to use features of a first release version, the second indication indicates to use a format of the first release version comprising using rate matching, transport block size (TBS) scaling, and/or a modulation and coding scheme (MCS) table supporting a 64 quadrature amplitude modulation (64QAM) to transmit a corresponding V2X packet.

16. The non-transitory machine-readable storage medium of claim 15, wherein the first indication comprises a proximity-based services (ProSe) per packet reliability (PPPR).

17. The non-transitory machine-readable storage medium of claim 16, wherein the PPPR has eight values ranging from one to eight, when a value of the PPPR is less than a threshold value, the first indication indicates to perform the PDCP duplication.

18. The non-transitory machine-readable storage medium of claim 15, wherein the second indication is a release version indication configured to indicate the AS layer a usage of features compatible with the second release version or features of a first release version.

* * * * *